Sept. 21, 1965 W. HAUSER-BUCHER 3,207,064
PRESS
Filed Sept. 19, 1963 5 Sheets-Sheet 1

INVENTOR
WALTER HAUSER-BUCHER
By
OSTROLENK, FABER, GERB & SOFFEN
ATTORNEYS

Sept. 21, 1965  W. HAUSER-BUCHER  3,207,064
PRESS
Filed Sept. 19, 1963  5 Sheets-Sheet 2

INVENTOR
WALTER HAUSER-BUCHER
By
OSTROLENK, FABER, GERB & SOFFEN
ATTORNEYS

Sept. 21, 1965    W. HAUSER-BUCHER    3,207,064
PRESS
Filed Sept. 19, 1963    5 Sheets-Sheet 4

INVENTOR
WALTER HAUSER-BUCHER
By
OSTROLENK, FABER, GERB & SOFFEN
ATTORNEYS

Sept. 21, 1965  W. HAUSER-BUCHER  3,207,064
PRESS
Filed Sept. 19, 1963  5 Sheets-Sheet 5
Fig. 14
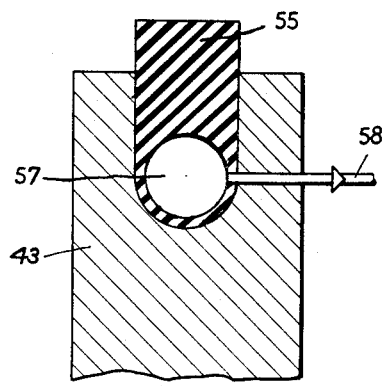
Fig. 15
Fig. 16
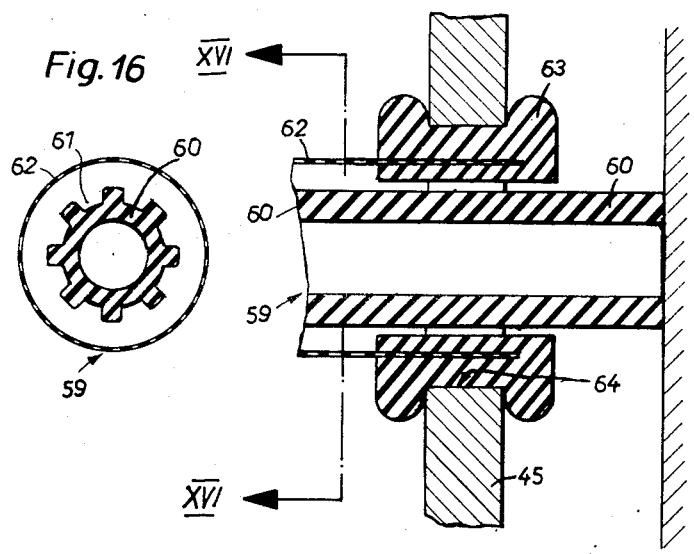
INVENTOR
WALTER HAUSER-BUCHER
By
OSTROLENK, FABER, GERB & SOFFEN
ATTORNEYS

United States Patent Office 3,207,064
Patented Sept. 21, 1965

3,207,064
PRESS
Walter Hauser-Bucher, Zurich, Switzerland, assignor to Bucher-Guyer A.-G., Maschinenfabrik, Zurich, Switzerland
Filed Sept. 19, 1963, Ser. No. 309,987
Claims priority, application Switzerland, Sept. 21, 1962, 11,143/62
7 Claims. (Cl. 100—107)

The present invention relates to presses and more particularly, though not solely, to presses for the extraction of juice from fruits, including grapes, and similar goods.

The press according to this invention is of the kind which comprises a pressing cylinder which is rotatable about a horizontal axis, a pressure plate axially displaceable in said cylinder, a counter-pressure plate closing said cylinder at one end thereof, and a plurality of flexible elongated members each extending from said pressure plate to said counter-pressure plate.

In known presses of this kind, the said flexible elongated members consist of chains or ropes. These serve the double purpose of loosening the mass which is subjected to the pressing operation, in order to facilitate the circulation of the expressed juice during that operation, on one hand, and of facilitating the removal of the husks and other residue after the pressing operation as the press is being emptied, by tearing apart the cake into which such residue has been pressed, on the other hand.

The known flexible members such as chains and ropes are appropriate for serving this second purpose, but their improving effect on the circulation of the expressed juice is not satisfactory.

It is one of the objects of the present invention to provide improved means for draining the juice from the mass which is subjected to pressing.

Another object of the invention is to provide means whereby solid particles are substantially prevented from escaping together with the expressed juice, and whereby accordingly a filtering effect is exerted on the said juice.

Moreover, in known presses of this kind the juice has been found to be undesirably exposed to light and air and thereby to an oxidation process which impairs the quality of the juice. It is therefore still another object of the present invention to provide a press in which the pressing cylinder is fluid-tight so that substantially the whole of the juice expressed is drained through the said draining means.

A further object of the invention is to provide appropriate collecting spaces for the juice thus drained from the mass subjected to the pressing operation.

The invention moreover has for one of its objects to provide an arrangement whereby the press can be easily and thoroughly cleaned.

Further objects and advantages of the invention will become apparent from the description, now to follow, of embodiments thereof which are represented in the accompanying drawings, by way of example only.

In these drawings:

FIG. 14 is a cross-section in an axial plane, at a larger scale, of the sealing ring at the periphery of the pressure plate in the press according to FIG. 12;

FIG. 15 is an axial section through the end portion and connecting means of one of the draining members in the press according to FIGS. 12 to 14; and FIG. 16 is a transverse section on the line XVI—XVI of FIG. 15, through the said draining member.

Figure 1:
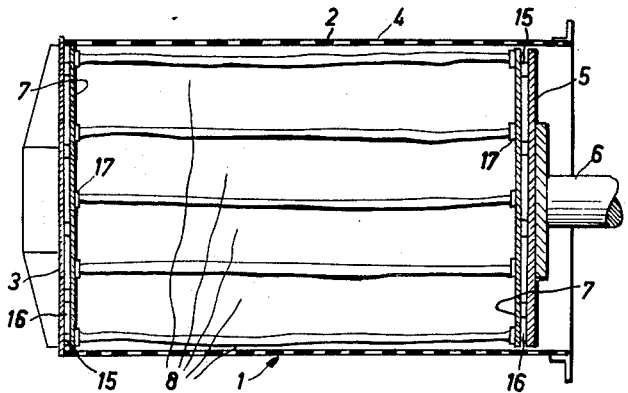
FIG. 1 is a partly schematical vertical axial section through a fruit press.

In FIG. 1, the reference 1 generally indicates a press cylinder comprising a cylinder body 2 and a counter-pressure plate or bottom 3 which closes the cylinder 1 at its one end. Over its whole surface, the cylinder body 2 is provided with slots 4 for the escape of the juice. Within the cylinder 1, a pressure plate 5 is axially displaceable; this pressure plate 5 is rigidly connected to an actuating piston 6 which is visible only in part in the drawing.

With each of the counter-pressure plate or bottom 3 and the pressure plate 5, a supporting plate 7 for flexible draining members 8 is removably connected.

Of the flexible draining members 8, only five are represented in FIG. 1, in a simplified manner, while four embodiments of the actual construction of the draining members in accordance with the present invention are shown by way of example in FIG. 4 to 11.

Figure 4:
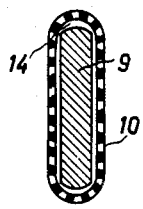
FIGS. 4, 6, 8 and 10 are cross-sections.
Figure 5:
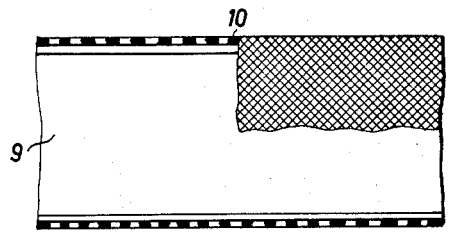
FIGS. 5, 7, 9 and 11 are corresponding longitudinal sections, through four different embodiments of the draining members according to the invention.

According to FIGS. 4 and 5, the core of each draining member consists of a flexible ribbon 9 of substantially rectangular cross-section, which is surrounded by a tissue-like sheath 10.

Figure 6:
Figure 7:
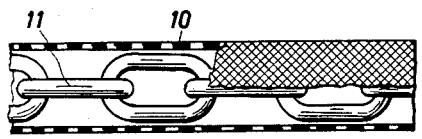

According to FIGS. 6 and 7, the core is a chain 11, again surrounded by a sheath 10.

Figure 8:
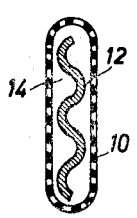
Figure 9:
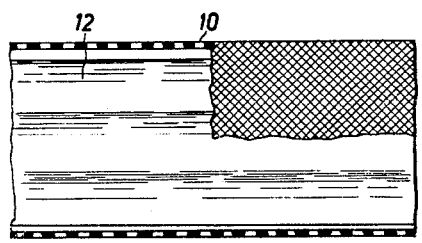

In FIGS. 8 and 9, the core 12 of the draining member is shown as having a corrugated cross-section.

Figure 10:
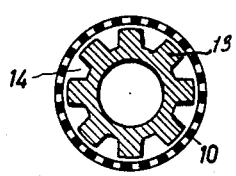
Figure 11:
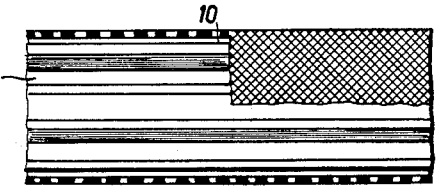

In FIGS. 10 and 11, the core of the draining member 13 is in the form of a rope of star-shaped, hollow cross-section.

In all four modifications, both the core 9, 11, 12, 13 and the sheath 10 may be made preferably from synthetic material. It is essential that the profile of the core of the draining member 8 is selected such as to provide cavities 14 between the sheath 10 and the respective core, which cavities ensure unobstructed draining of the fruit juice along the draining members. It is obvious that in this respect, a core having a profile like that shown in FIGS. 10 and 11 is particularly advantageous.

Figure 2:
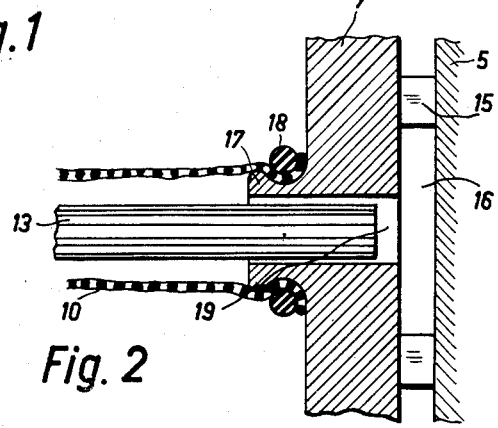
FIG. 2 shows, at a larger scale and in vertical axial section as well, the connection between a draining member and its supporting plate.
Figure 3:
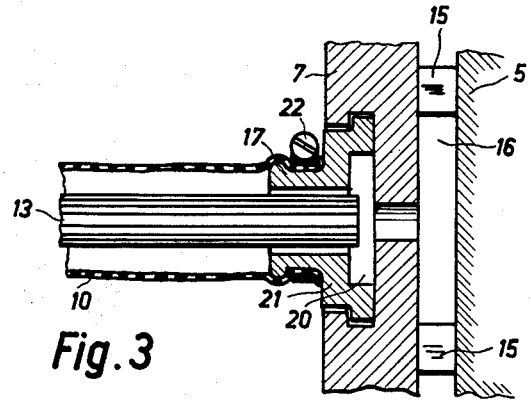
FIG. 3 represents, in a similar manner, a modification of the said connection.

FIGS. 2 and 3 show how the supporting plates 7 are fixed to the pressure plate 5 (or to the counter-pressure plate 3) with interposed spacing members 15, so that they are spaced from the supporting plate 5 (or the plate 3, respectively) to provide an interval 16 through which the fruit juice is drained.

The supporting plates 7 are provided with a number of connecting sockets 17 distributed on their sides facing the operating space in the press cylinder. FIG. 2 shows an axial section through such a socket 17 at a larger scale. The sheath 10 is drawn over the socket 17 and retained thereon by a rubber ring 18. The core 13, which here has a star-shaped cross-section, extends into a bore 19 of the supporting plate 7.

When the press is operated, the juice of the fruit which is compressed by the movable pressure plate penetrates into the inside of the sheath 10, which acts as a filter, and flows along the longitudinal grooves 14 of the star-shaped profile 13 and through the bore 19 into the interval space 16.

Another mode of anchoring the draining members 8 to the suppoorting plate 7 is shown in FIG. 3. According to this, the supporting plate 7 is provided with guiding recesses 20 into which slide pieces 21 are slidably inserted lengthwise and are arrested by means not shown.

Here, the sockets 17 are integral with the slide pieces 21. Each sheath 10 is fixed to the respective socket by means of a hose clamp 22. For cleaning the sheath 10 and the core 13, the slide pieces 21 located in the respective guiding recesses 20 are extracted therefrom. In this manner the sheaths 10 and the core 13 can be replaced expeditiously and without any substantial loss of time.

In the press shown in FIGS. 12 to 15, an actuating cylinder 33 closed by a head 34 is rotatably supported on a bearing support 32 at the left-hand end of a ground plate 31. The actuating cylinder 33 carries a flange 36 reinforced by ribs 35, this flange being connected to a counter-pressure plate 38 by means of rods 37. The rotatable assembly thus formed is supported on one hand in the bearing support 32 as already mentioned, and, on the other hand, on two supporting rollers 39 on which the counter-pressure plate 38 rests, and it is rotated in well-known manner by an electric motor not shown in the drawing.

A differential piston 40 is axially displaceable in the actuating cylinder 33, this piston being acted upon by hydraulic pressure fluid supplied at 41 and 42. At its end emerging from the actuating cylinder 33, the differential piston 40 carries a pressure plate 43 to which a supporting plate 45 is removably connected in spaced relation by means of spacing members 44. A similar supporting plate 45 is provided on the opposite side on the counter-pressure plate 38.

When the pressing operation is initiated, the pressure plate 43 moves within the pressing cylinder 46. The counter-pressure plate 38, the pressure plate 43 and the cylinder 46 jointly form a press basket 48 which on all sides encloses a pressing space 47. The pressing cylinder 46 is provided with two flanges 49 and 50 through which the three rods 37 pass in such manner that the cylinder 46 is slidable on the rods 37. Two rods 52 are attached to two extensions 51 of the flange 49 of cylinder 46; these rods are displaceable by means of two hydraulic cylinders 53 mounted at 180° from each other on the flange 36. The pressing cylinder 46 is displaceable in the horizontal axial direction along the rods 37 depending on the side to which fluid is admitted into the cylinders 53. For clarity's sake, one of the two rods 52 and the corresponding cylinder 53 have been shown rotated through 90° from their actual position into the plane of the drawing.

For the external sealing of the space defined by the pressing cylinder 46, the pressure plate 43 and the counter-pressure plate 38, which space comprises the pressing space 47 and two juice collecting spaces 54 comprised between the supporting plates 45 and the pressure plate 43 and counter-pressure plate 38, respectively, the pressure plate 43 carries a sealing ring 55 at its periphery, and the pressing cylinder 46 is provided with another sealing ring 56 at its right-hand end.

Sealing pressure at this place is provided by the hydraulic cylinders 53. The particular construction of the sealing ring 55 is shown in FIG. 14. The sealing ring 55 has a cavity 57 to which a pneumatic or hydraulic pressure fluid can be supplied by means of a supply conduit 58.

Figure 12:
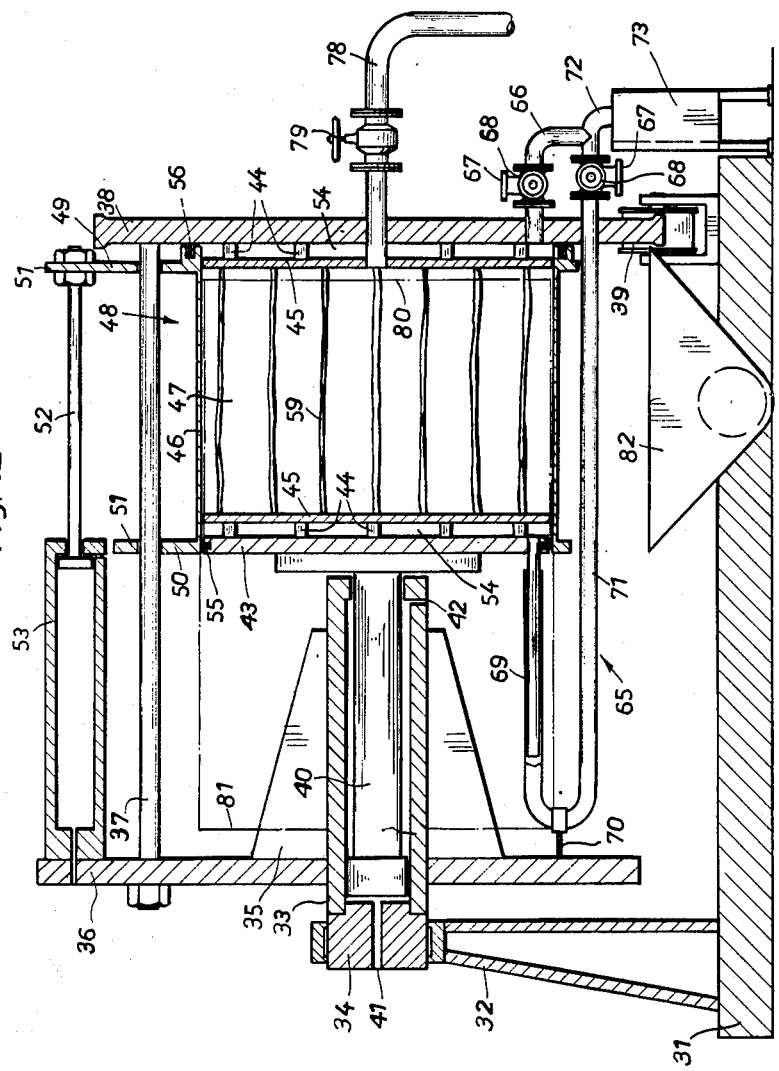
FIG. 12 is a longitudinal section through another embodiment of the press according to the invention.

Between the pressure plate 43 and the counter-pressure plate 38 a plurality of draining members 59 are stretched across the pressing space 47, only a few of them being represented schematically in FIG. 12. An example of such a draining member 59 is shown in FIGS. 15 and 16 in which its anchoring to the supporting plates 45 is also represented.

The draining members 59 comprise a core 60 which has a star-shaped profile providing longitudinal grooves 61, and which preferably is made from flexible synthetic material. The core 60 is surrounded by a sheath 62 which is permeable to the fruit juice and capable of filtering it, which sheath may consist of fabric made from synthetic material. The two ends of the sheaths 62 are fixed in connecting rings 63 which consist of deformable material. The two supporting plates 45 have openings 64 corresponding in number to the number of draining members 59, in which the connecting rings 63 for these members are lodged. The connecting rings 63 can be inserted by deforming them radially while the cores 60 are somewhat retracted from the zone of the supporting plates 45.

The juice collecting spaces 54 are connected to outlets 65 and 66 each of which is provided with a water connection 67 and a shut-off valve 68. The outlet 65 which is connected to the left-hand juice collecting space 54 must allow for the displacement of the pressure plate 43 and therefore is subdivided into a pipe 69 which is rigidly connected to the pressure plate 43, and a second pipe 71 which is fixed at 70 to the flange 36, the first pipe 69 extending telescopically into the second pipe 71. The two outlets 65 and 66 join a common outlet 72 which discharges the juice into a juice receiver 73.

Figure 13:
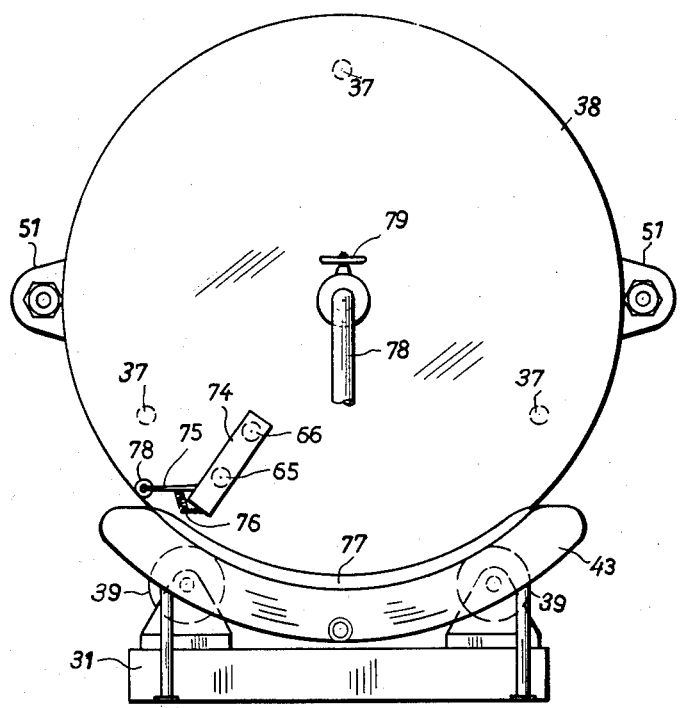
FIG. 13 is an end view of the press according to FIG. 12.

The whole pipe system comprising the outlets 65 and 66 rotates with the rotatable assembly of the press supported in the bearing support 32 and on the supporting rollers 39, so that the common outlet 72 must be open only in the region of the juice receiver 73, while the said assembly rotates. In FIG. 13, means for controlling a shut-off device 74 are shown by which the issue from the collecting spaces 54 is temporarily opened and shut off as the press rotates to permit the discharge of the juice only when it will be discharged into the receiver 73. For this purpose, the shut-off member 74 carries an operating lever 75 which is maintained in closing position by means of a traction spring 76. The juice receiver 73 is provided with a control cam 77. As the press basket 48 rotates, the roller 78 on the operating lever 75 runs onto the control cam 77 on reaching the zone of the juice receiver 73, whereby the operating lever 75 is swung upwards, thus bringing the shut-off member 74 into opening position against the action of the spring 76. The juice then is allowed to flow from the two juice collecting spaces 54 into the juice receiver 73. When the roller 78 on the operating lever 75 leaves the control cam 77, the traction spring 76 automatically retracts the lever 75 into closing position.

The fruit mash is fed into the press basket 48 through an axial supply pipe 78 by means of a mash pump not shown in the drawing. When its supply has been completed, a valve 79 is closed.

At the beginning of the pressing operation, the pressure plate 43 and the pressing cylinder 46 are in the position as shown. Under the effect of the differential piston 40 being acted upon by the hydraulic fluid on its larger face, the mash to be pressed is now under pressure between the pressure plate 43 and the counter-pressure plate 38. As the press action increases, the draining members 59 more and more come into transverse positions within the pressing space 47, and acting as ducts, especially from the inner parts of the space 47, they cause the juice to flow into the juice collecting spaces 54 at the front ends. The sheath 62 which covers the longitudinal ducts 61 along the core 60 of the draining members 59 prevents the residue comprising the husks and other solid parts of the mash into the longitudinal ducts 61, whereby these always remain unobstructed during the pressing operation and ensure free circulation of the juice lengthwise of the draining members 59. As the juice passes through the sheath 62, a desirable filtering effect is obtained. When the pressing operation has been completed, the pressure plate 43 approximately has the end position indicated by the dash-and-dot line 80. In order to loosen the pressed cake formed by the mash residue, the pressure plate 43 is retracted into its initial position by supplying hydraulic fluid under pressure to the working space behind the smaller face of the differential piston 40. As the pressure plate thus moves back, the draining members 59 are again stretched into their approximately horizontal longitudinal positions, whereby they loosen the said cake. Subsequently, the alternate pressing and loosening is repeated several times until the extraction has been pushed to the desired degree.

For removing the mash residue from the pressing basket 48, one first retracts the pressure plate 43 into its initial position. Thereupon, the pressing cylinder 46 is brought into the position indicated by the dash-and-dot outline 81 by means of the two rods 52, upon actuation of the two cylinders 53. Thereby, the mash residue cake is set free at its periphery and falls down into a comminuting and removing device 82. By enabling the pressing cylinder 46 to be brought into a working position and an emptying position, the particular advantage is obtained that the mash residue falls easily into the comminuting and removing device 82, without leaving substantial traces. Moreover, the draining members 59 become easily accessible for cleaning.

While the pressing basket 48 is closed, this and the draining members 59 can be cleaned firstly by pumping cleaning liquid into the basket 48 through the central inlet 78 by means of the mash pump. Since the basket 48 is fluid-tight, effective rinsing can be obtained by rotating the pressing assembly.

Another mode of cleaning would consist in connecting the sockets 67 of the outlets 65 and 66 into a circuit through which a cleaning liquid is circulated. For this purpose, it would be appropriate first to open the shut-off valve 68 of that one of the said outlets which is connected to the supply branch of the said circuit while keeping the corresponding shut-off valve 68 of the other outlet closed. The supplied cleaning fluid then circulates from the first-mentioned outlet through one of the juice collecting spaces 54 and thence through the sheaths 62 into the pressing space 47. Return of the cleaning fluid which thus gradually accumulates in the pressing space 47 is then effected through the other outlet by opening the shut-off valve thereof while closing the shut-off valve of the first-mentioned outlet.

In this way, the draining members 59 can be cleaned inside without it being necessary to dismantle them.

I claim:

1. A press comprising a pressing cylinder, a first plate axially displaceable in said cylinder, a second plate closing said cylinder at one end thereof, said first and second plate defining between them a pressing space within the said cylinder, a plurality of flexible elongated draining members extending through said pressing space from one of the said plates to the other, each of said draining members comprising a flexible core and a permeable sheath surrounding said core, said core and sheath defining between them at least one draining duct, means associated with at least one of said first and second plate defining at least one collecting space for fluid outside said pressing space, the said at least one draining duct of each of the said draining members communicating with said collecting space, a pressure plate axially displaceable in said cylinder and on which said first plate is mounted in spaced relation, a counter plate on which said second plate is mounted in spaced relation, a plurality of tubular connecting sockets on each of said first and second plate, the said sheaths of the draining members being externally fitted and retained on said sockets and the said cores of the draining members extending into the respective sockets.

2. A press as claimed in claim 1 in which each of the said first and second plates has a plurality of guides formed in its surface bounding the said pressing space, and the said sockets being formed as slidable pieces engaging the said guides.

3. A press comprising a pressing cylinder, said pressing cylinder movable between a first position and a second position; a first plate axially displaceable in said cylinder independent of the movement of said cylinder, a second plate closing said cylinder at one end thereof, said first and second plate defining between them a pressing space within the said cylinder, a plurality of flexible elongated draining members extending through said pressing space from one of the said plates to the other, each of said draining members comprising a flexible core and a permeable sheath surrounding said core, said core and sheath defining between them at least one draining duct, means associated with at least one of said first and second plate defining at least one collecting space for fluid outside said pressing space, the said at least one draining duct of each of the said draining members communicating with said collecting space, movement of said cylinder from said first position to said second position completely exposing said plurality of draining members.

4. The press of claim 3 and further comprising a pressure plate axially displaceable in said cylinder and on which said first plate is mounted in spaced relation, and a counter plate on which said second plate is mounted in spaced relation.

5. The press of claim 4 in which said pressure plate and first plate define between them a first collecting space, and said counter plate and second plate define between them a second collecting space.

6. The press of claim 5 in which said pressing space and said collecting spaces are jointly enclosed in fluid-tight manner by said pressing cylinder, pressure plate and counter plate.

7. The press of claim 6 wherein each of said collecting spaces has a separate outlet and said separate outlets being connected to a common outlet.

References Cited by the Examiner

UNITED STATES PATENTS

| 565,436 | 8/96 | Currier | 100—73 |
|---|---|---|---|
| 838,841 | 12/06 | Carlson | 100—125 X |
| 1,000,540 | 8/11 | Neikirk | 210—211 |
| 1,071,020 | 8/13 | Bartholomew | 100—116 |
| 2,575,734 | 11/51 | Schulman | |
| 3,028,971 | 4/62 | Peterson | 100—127 X |
| 3,103,164 | 9/63 | Willmes | 100—107 |

FOREIGN PATENTS

| 1,130 | 4/66 | Great Britain. |
|---|---|---|
| 902,343 | 8/62 | Great Britain. |
| 332,264 | 10/58 | Switzerland. |

WALTER A. SCHEEL, *Primary Examiner.*

LOUIS O. MAASSEL, *Examiner.*